US008935491B2

(12) United States Patent
 Sandstrom

(10) Patent No.: US 8,935,491 B2
(45) Date of Patent: Jan. 13, 2015

(54) MEMORY ARCHITECTURE FOR DYNAMICALLY ALLOCATED MANYCORE PROCESSOR

(71) Applicant: Mark Henrik Sandstrom, Jersey City, NJ (US)

(72) Inventor: Mark Henrik Sandstrom, Jersey City, NJ (US)

(73) Assignee: Throughputer, Inc., Jersey City, NJ (US)

( * ) Notice: Subject to any disclaimer, the term of this patent is extended or adjusted under 35 U.S.C. 154(b) by 32 days.

(21) Appl. No.: 13/906,159

(22) Filed: May 30, 2013

(65) Prior Publication Data

US 2014/0229669 A1     Aug. 14, 2014

Related U.S. Application Data

(60) Provisional application No. 61/764,521, filed on Feb. 13, 2013.

(51) Int. Cl.
| G06F 12/00 | (2006.01) |
| G06F 13/00 | (2006.01) |
| G06F 13/28 | (2006.01) |
| G06F 9/46 | (2006.01) |
| G06F 3/06 | (2006.01) |
| G06F 9/50 | (2006.01) |

(52) U.S. Cl.
CPC ............... *G06F 3/0613* (2013.01); *G06F 9/46* (2013.01); *G06F 9/50* (2013.01)
USPC .......................................... 711/158; 718/102

(58) Field of Classification Search
None
See application file for complete search history.

(56) References Cited

U.S. PATENT DOCUMENTS

| 6,782,410 | B1 | 8/2004 | Bhagat |
| 7,093,258 | B1 | 8/2006 | Miller et al. |
| 7,685,409 | B2 * | 3/2010 | Du et al. ........................ 712/228 |
| 2002/0124012 | A1 | 9/2002 | Leim et al. |

OTHER PUBLICATIONS

McCann et al.,A Dynamic Processor Allocation Policy for Multiprogrammed Shared-Memory Multiprocessors, 1993, ACM, 33pages (146-178).*

* cited by examiner

*Primary Examiner* — Aimee Li
*Assistant Examiner* — Gary W Cygiel

(57) ABSTRACT

Invented hardware logic based methods and systems enable dynamically allocating and assigning an array of processing cores among instances of software programs, based on at least in part on indications of which instances of the programs are ready-to-execute, wherein such an indication for any given program instance is based at least in part on whether its fast-access memory contents are ready for it to execute without it needing at that time access to memories other than its fast-access memory. The invention also provides hardware logic based mechanisms for automating the updating of the fast-access memories for instances of the programs dynamically sharing the array of cores according to control by the program instances via their associated hardware device registers, including while a given program instance whose fast-access memory contents are being updated is not assigned for execution on any of the cores.

16 Claims, 1 Drawing Sheet

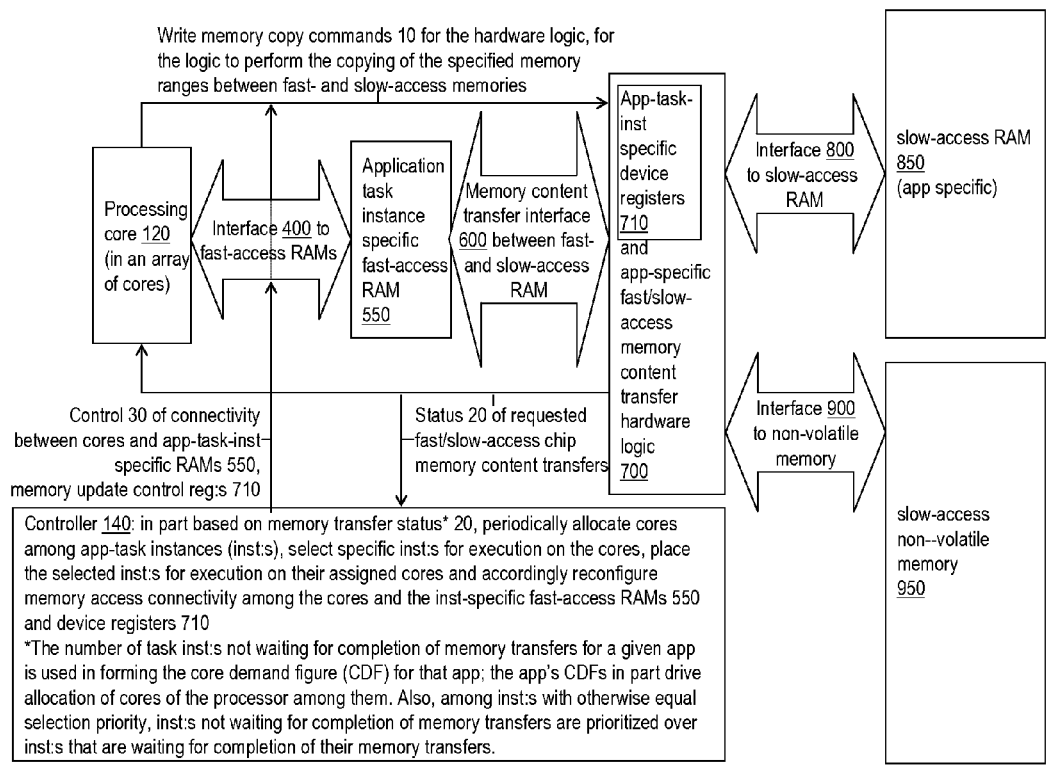

MEMORY ARCHITECTURE FOR DYNAMICALLY ALLOCATED MANYCORE PROCESSOR

CROSS-REFERENCE TO RELATED APPLICATIONS

This application claims the benefit of the following application, which is incorporated by reference in its entirety:
[1] U.S. Provisional Application No. 61/764,521, filed Feb. 13, 2013
This application is also related to the following, each of which is incorporated by reference in its entirety:
[2] U.S. Utility application Ser. No. 13/184,028, filed Jul. 15, 2011;
[3] U.S. Utility application Ser. No. 13/270,194, filed Oct. 10, 2011;
[4] U.S. Utility application Ser. No. 13/277,739, filed Nov. 21, 2011;
[5] U.S. Utility application Ser. No. 13/684,473, filed Nov. 23, 2012;
[6] U.S. Provisional Application No. 61/804,660, filed Mar. 23, 2013;
[7] U.S. Provisional Application No. 61/823,368, filed May 14, 2013; and
[8] U.S. Utility application Ser. No. 13/901,566, filed May 24, 2013.

BACKGROUND

1. Technical Field

This invention pertains to the field of information processing, particularly to the field of techniques for improving computing resources utilization and application program processing on-time throughput performance via reduced memory access times.

2. Descriptions of the Related Art

In conventional microprocessor and computer system architectures, without specific optimization of memory access operations, significant portions of the system processing capacity gets wasted as software programs have to stall while waiting for instructions and/or processing data being fetched from slow-access memories. In particular, slow-access memory access data rates have not increased at the same pace as the theoretical instruction/data processing capacities of microprocessors, including manycore processors. Conventional approaches for this so called memory-wall performance bottleneck rely on system software, which runs on the processing cores of the given microprocessor, to try to dynamically keep the needed program codes and data on fast-access on-chip memory based on the state of the user programs being processed. As such, the more dynamic the system software tries to make the fast- and slow-access memory content optimizations, the greater the portion of the system processing core capacity that is consumed by the system software tasks (e.g. copying memory contents between memory types of different access latencies and storage capacities) rather than processing user programs. On the other hand, without dynamic optimization of fast-access, fast-access memory contents, the user program processing performance is likely to at least periodically suffer from long access times to instructions/data residing at slow-access off-chip memories.

There thus is a need for innovations enabling dynamic optimization of the fast-access memory contents for microprocessors, including manycore processors being dynamically shared among a number of internally parallelized user programs, without relying on system software that would consume processing capacity of the processing cores of the given processor from the user programs running on it.

SUMMARY

The invention provides hardware implemented methods and systems for selecting pieces of executable software programs for execution on a set of processing cores based at least in part on hardware logic implemented indications of whether any given one of said pieces of programs is waiting for its fast-access memory contents to be updated, as well as for automating via hardware routines the updating of the fast-access memory contents for the programs.

An aspect of the invention provides a hardware logic control system for an array of processing cores shared dynamically among instances of a set of software programs. Such a system includes: (1) a collection of fast-access memories, with each memory in the collection dedicated to its associated instance of the programs, (2) a subsystem for updating contents of the fast-access memories based on control by the program instance associated with each given fast-access memory of the collection and indicating whether the contents of any given memory in the collection is updated, and (3) a controller for allocating the cores among the programs at least in part based on respective numbers of such instances by individual programs of said set that have their dedicated fast-access memories indicated as updated by the subsystem for updating contents of the fast-access memories. Various embodiments of the system include further elements and features, such as: (a) a collection of hardware device registers for managing the updating of contents of the fast-access memories, with each register in said collection dedicated to its associated instance of the programs; (b) a hardware logic subsystem for connecting, under control by the controller, each presently executing instance of the programs on the array of cores with its dedicated device register within the collection; (c) whereby the hardware device registers for a given program instance include: (i) control bits, for the program instance to write to defined values to inform the subsystem of a requested memory content transfer operation to update the contents of its fast-access memory and (ii) status bits, which indicate whether the fast-access memory of the given program instance has its contents updated, as well as an expression of time until completion of the requested memory content transfer operation; (d) wherein the subsystem for updating contents of the fast-access memories indicates the given fast-access memory as updated when said memory is not waiting for a completion of any memory content transfers from or to it; and/or (e) wherein the instance of the given program is: a piece of the program such as a task, a thread, an actor, or an instance any of the foregoing, or an independent copy of the given program. A further aspect of the invention provides a control process that the system per above implements in hardware.

Another aspect of the invention provides a hardware logic implemented control process for an array of cores shared dynamically among instances of a set of software programs. Such a process involves the following sub-processes: (1) allocating the array of cores among the set of programs at least in part based on demands for cores of the array by one or more of said programs; and (2) for each given program among said set for which the allocating yielded at least one core for an upcoming core allocation period (CAP), assigning, from instances of such a given program, specific selected instances for execution on such a number of the cores that were allocated to the given program for that CAP, based on at least in part on fast-access memory contents ready status indicators of the instances of the program. Various embodiments of the method involve further steps and features, such as whereby: (a) the assigning involves: producing an execution priority ordered list of instances of the given program that is used in selecting a subset (including, when the entire array of cores were allocated to that program, up to all) of the instances for execution on the upcoming CAP, through classifying the instances into groups that include, in their descending selection priority order: (i) instances that are not waiting for either arrival of input data or completion of memory content transfers to update their fast-access memories, (ii) instances that have input data to be processed but are waiting for completion of memory content transfers between their slow-access and fast-access memories, (iii) instances whose fast-access memory contents are ready for resuming their execution but who are waiting for input data to process, and (iv) rest of the instances; (b) any such instance within said group (ii) that has its expression of time until completion of its requested memory content transfer greater than a duration of the CAP is moved to the group (iv) before the assigning; (c) any instances within the group (ii) are prioritized for execution according to their ascending expressions of time until completion of their requested memory content transfers; (d) managing, by instances of the programs, a sub-process of updating contents of their fast-access memories through a collection of hardware device registers, with each register in said collection dedicated to its associated instance of the programs, and connecting each instance of the programs assigned for execution on the array of cores with its dedicated device register within the collection; (e) said device registers include status bits, which indicate, for the fast-access memory of the instance of the programs associated with a given register of the collection whether a requested fast-access memory content update operation is completed, and/or an expression of time until a completion of the requested fast-access memory content update operation; (f) connecting information from said status bits with the assigning sub-process; and/or (g) expressions for the demands for the cores by the programs are formed, at least in case of a given one of the programs, at least in part based on a number of such instances of the given program that have their fast-access memory contents indicated as ready for execution of the program instance in question. A yet another aspect of the invention provides a hardware logic system for implementing the method per the foregoing.

A further aspect of the invention provides a hardware implemented method for updating contents of a fast-access memory for a software program. This method involves: (1) by the program, writing values into hardware device register bits to inform a hardware logic function of a requested memory content transfer operation to update the contents of the fast-access memory; and (2) in response to the writing, by the hardware logic function, performing the requested operation and signaling a status of its performing of that requested operation. Various embodiments of such a method involve further steps and features, such as by which: (a) the register bits include control bits, which specify (i) an address range within the fast-access memory whose contents the hardware logic function is to copy to a slower-access memory, and (ii) address range within the slower-access memory where said contents are to be copied to by the hardware logic function; (b) the register bits include control bits, which specify (i) an address range within a slower-access memory whose contents the hardware logic function is to copy to the fast-access memory, and (ii) address range within the fast-access memory where said contents are to be copied to by the hardware logic function; (c) the register bits include one or more status bits, which specify whether the requested memory content transfer operation is completed, as well as an expression of time until a completion of the requested memory content transfer operation; and/or (d) said expression of time is computed by hardware logic as a number of data units yet to be copied until the requested memory content transfer operation is completed, wherein said data unit is an amount of data bits transferred between specified source and target memories per a clock cycle, or a number of such data units already copied out of the requested memory content transfer operation. A yet another aspect of the invention comprises a system that provides the hardware for implementing the method per above.

BRIEF DESCRIPTION OF THE DRAWINGS

FIG. 1 shows, in accordance with an embodiment of the invention, a functional block diagram for a memory architecture for dynamically shared manycore processor, including mechanisms for intelligently self-updating the contents of the fast-access segments of the memories for the program instances sharing the processor, as well as for allocating and assigning the cores of the manycore processor at least in part based on fast-access memory contents updating status of the instances of the programs.

DETAILED DESCRIPTION

FIGS. and related descriptions below provide specifications for embodiments and aspects of hardware-logic based systems and methods for automatically, under minimal software involvement, updating the contents for the fast-access memory segments of instances of application programs, as well as for scheduling and placing such program instances for execution on a set of processing cores, at least in part based on whether the contents of the fast-access memories of said instances are updated so as to allow a given program instance to continue its execution.

The invention is described herein in further detail by illustrating the novel concepts in reference to the drawings. General symbols and notations used in the drawings:

Boxes indicate a functional digital logic module.

Arrows indicate a digital signal flow. A signal flow may comprise one or more parallel bit wires. The direction of an arrow indicates the direction of primary flow of information associated with it with regards to discussion of the system functionality herein, but does not preclude information flow also in the opposite direction.

A dotted line marks a border of a group of drawn elements that form a logical entity with internal hierarchy, such as the modules constituting the multi-core processing fabric 110 in FIG. 1.

Lines or arrows crossing in the drawings are decoupled unless otherwise marked.

For clarity of the drawings, generally present signals for typical digital logic operation, such as clock signals, or enable, address and data bit components of write or read access buses, are not shown in the drawings.

General notes regarding this specification (incl. text in the drawings):

For brevity: 'application (program)' is occasionally written in as 'app', 'instance' as 'inst' and 'application-task/instance' as 'app-task/inst' and so forth.

Terms software program, application program, application and program are used interchangeably in this specification, and each generally refer to any type of executable computer program.

FIG. 1 provides a functional block diagram for a manycore processor memory architecture according to an embodiment of the invention.

The system per FIG. 1 operates, in an illustrative scenario, as follows:

A hardware logic implemented controller 140 periodically assigns a piece of executable software program, referred to as a task, for execution on a core 120 within a manycore fabric, with such a fabric being in certain embodiments of the invention alike the dynamically shared manycore fabric per the references [1] through [8], in particular the element referred to with a reference character 110 in these patent applications. A given task instance executing on its assigned core accesses its program instructions and processing data from its dedicated fast-access, e.g. on-chip, random access memory (RAM) 550. The task, with the hardware resources per FIG. 1, seeks to keep the instructions segments and the data blocks it needs most frequently on its fast-access RAM 550 for reduced access latency. However, often the entire volume of instructions and data that the given task needs access to cannot be held on the fast-access RAM 550, but instead, a larger, slower-access, e.g. off-chip, RAM 850 is needed for storing the entirety of the code and processing data of the task. For context, a possible scenario when it may be more advantageous to have more RAM (fast-access and slow-access combined) per an app-task-inst than what can fit into its fast-access RAM, than to distribute the application processing to a greater number of (e.g. pipelined) 'smaller' tasks whose instructions and processing data would fit into their (similarly sized) fast-access RAMs, can occur in circumstances where the volume of inter-task data transfers would exceed a level beyond which the costs (e.g. data transfer time) of such inter-task communications among such smaller tasks would exceed the costs (e.g. task idle time) of having to reshuffle contents between the fast and slow RAMs of the combined task as the processing context or phase of that 'larger' task changes. I.e., considering the relative costs (e.g. differential energy consumption, completion time of given processing activity, shared system resource usage etc.) of breaking the processing to a greater number of smaller tasks vs. having a smaller number of bigger tasks who (more frequently) need to update their fast-access RAM contents, an optimum break down of a given application processing into concurrently executable tasks can be found, and in at least some scenarios, such an optimum breakdown of application processing can involve both the division of the application into separate tasks as well as the use of both fast-access on-chip and slower-access but higher capacity off-chip RAM for at least some of the tasks, with capabilities, per the herein described aspects and embodiments of the invention, for high performance and resource efficient updating of fast-access RAM contents of such tasks.

When a task thus needs access to instructions or data that has to be fetched from the slow-access RAM, the task writes 10 to specified hardware device registers 710 (at defined addresses within the task's memory space) information that is used by the hardware logic 700 to carry out the needed memory content transfers between the fast-access RAM 550 and the slow-access RAM 850 over the interfaces 600 and 800 connecting the fast-access RAM 550, the hardware logic 700 performing the memory content transfers, and the slow-access RAM 850. Note that the control info 30 from the controller 140 per FIG. 1 is used to dynamically connect a given application task instance software, from whichever execution core 120 that the given software instance may be presently executing at, to its dedicated RAM 550 as well as to its dedicated memory content transfer control device registers 710. In a typical scenario, the memory content transfer performed by the hardware logic 700 involves:

i) copying the contents from a memory range specified 10 by the task software in the fast-access RAM 550 to another specified 10 memory range in the slow-access RAM 850 to make room for needed other instructions and/or data to be fetched from the slow-access RAM, and ii) copying contents from a further specified 10 memory range in the slow-access RAM 850 to the specified memory range in the fast-access RAM 550 of the task instance.

For practical illustration, an example specification for the task-instance specific hardware device registers 710 (in the logic module 700) writeable and readable by software executing on a core 120 assigned at that time for the given application task instance, controlling the memory transfer operations performed by the hardware logic module 700, is provided in Table 1 below:

TABLE 1

| Register name [address (hex)] in the processor core address space | Contents of the bits in the register |
|---|---|
| Memory content transfer status [40001000] | Status, e.g. 1 = active, 0 = completed or never activated; sellable by task software, resettable by hardware. (In FIG. 1, this status is carried by signal 20). Hardware provided estimate of the number of clock cycles until completion of the transfer specified in below registers, expressed as a number data units yet to be transferred, e.g. in units of bytes, words etc, or whatever the amount of data bits that are transferred between memories as specified via below registers per a clock cycle. |
| Command for copying contents from fast-access memory to larger capacity, slower-access memory [40001004] | Length (e.g. in bytes, words, etc) of the content block to be copied; value 0 indicates no copying needed in this direction. Start address of the block in the read-from memory. Start address in the write-to memory. |
| Command for copying contents from larger capacity, slower-access memory to fast-access memory [40001008] | Same bit fields as above. |

Regarding the example fast/slow-access memory content transfer control and status device registers in Table 1, please note that in various scenarios, multiple types of variations of the information formats are possible. For instance, it is possible that the software configuring the commands for copying contents between certain blocks at fast and slow access memories, instead of specifying the actual hardware memory address ranges, uses e.g. enumerated references to memory blocks to be copied, with the hardware providing a look-up table storing the physical memory address ranges corresponding to any given target memory block referred to by the software via such shorthand notations. That way, the software requesting an slow/fast access memory transfer by configuring this device register does not need to know the actual source or destination physical memory addresses of the content block to be transferred.

As illustrated in Table 1 above, in addition to specifying the memory ranges to be copied between slow- and fast-access RAMs, the task software also sets 10 a device register bit indicating, when applicable, that the task is waiting for requested memory content transfers to be completed before it can resume executing. While it has that way signaled (through the bit 20 to the controller 140) that it is waiting for updating of its fast-access memory 550, the task instance software can however back up its state (e.g. processor register file contents) from its present execution core to its dedicated RAM 550. The hardware logic 700 resets this memory contents transfer status bit once the specified transfers are completed, and this bit 20 is provided as a status back to the task software (readable by the task from the same device register location to where the task set that bit). This memory content transfer completion status 20 is also provided from the hardware logic 700 to the controller 140, so that the controller know which program task instances at any given time are waiting for updating of their fast-access RAM contents before such task instances are able to resume their execution.

The controller 140 hardware logic uses (among any other relevant info, such as per the references [1]-[8]), these fast-access memory contents ready/not ready status bits 20 from the application task instances hosted on its local processor in deciding which task instances to select for execution on the cores of the local processor at any given time. To minimize core idling, the controller task selection algorithm gives greater selection priority, at least among instances which otherwise would have equal selection priority, to such task instances whose status 20 indicates that the task is not waiting for a completion of fast/slow-access memory content transfers before it can continue its execution. According to certain embodiments of the invention, the controller algorithms operate as specified in the referenced patent application [5] for the elements referred to in that application as process 300 and controller 140. In such embodiments, the controller uses the fast-access memory ready status indications 20 of the application task instances sharing the array of processing cores in one or more ways as follows:

a) The core demand figure (CDF) for a given application program for the given processor is formed at least in part based on the number of its local task instances whose fast-access memory is indicated 20 as up-to-date (i.e. not waiting for a completion of a fast/slow-access memory content transfer). The CDFs of the application programs sharing the given processor in turn are used by the controller hardware logic 140 in periodically optimizing the allocation of the cores of the processor among the applications hosted on it, in order to maximize the system-wide value-add of the application processing throughput.

b) Once the controller logic 140 has run its core to application allocation algorithm, for each given application hosted on the local processor that got allocated at least one core for the following core allocation period (CAP), the logic assigns specific selected task instances (inst:s for short) for execution on the number of cores allocated to the given application, according to an execution priority order of the inst:s of the application. This priority order of the inst:s of a given application is based at least in part on the fast-access memory contents ready status indicators 20 of the inst:s. In a particular embodiment, the prioritization among inst:s of a given application, to produce the execution priority ordered list of its inst:s that is used in selecting the inst:s of the given application for execution on the next CAP, is done as follows:

i) The inst:s are first classified into four groups: 1) inst:s that are fully ready to execute, e.g., they are not waiting for either arrival of input data or completion of memory content transfers to update their fast-access RAM; 2) inst:s that have input data to be processed but are waiting for completion of memory content transfers between their slow- and fast-access RAMs, 3) inst:s whose fast-access RAM contents are ready for resuming their execution but who are waiting for input data to process; 4) the rest of the inst:s.

ii) After the grouping per step i) above, within the group 2), the inst:s that have their fast-access memory status 20 indicating readiness for execution are prioritized ahead of the inst:s within that group whose status 20 indicates the inst as waiting for completion of its slow/fast access memory content transfers. Otherwise, the inst:s within each of the groups 1) and 2) are prioritized according to their relative volumes of input data to be processed.

iii) With the intra-group prioritization per step ii) done, the inst:s of the application are selected for execution starting from the group 1) and proceeding toward the group 4) as long as there are cores remaining in the number of cores allocated for the given application by the latest run of the core allocation algorithm.

In an alternative embodiment, the status 20 indicates the time (if any) remaining, e.g. in clock cycles, for completion of the requested memory content transfer for its task instance. In such an embodiment, the inst:s with the indicated time until completion of the requested memory content transfer greater than the duration of the CAP are moved to the group 4) for the inst prioritization algorithm per above. Moreover, in some of such embodiments, within the group 2), the inst:s are prioritized for execution according to their ascending indicated time until completion of their present requested memory content transfers.

The app-task-inst to core assignment algorithms that the controller 140 periodically performs result in the controller providing 30 dynamic configuration for the interface logic 400 between the cores of its local processor and its app-task-inst specific RAMs 550 as well as device registers 710 so that each given core 120 has read and write access to the RAM 550 and the device registers 710 of the app-task-inst assigned presently for execution on the given core, and so that external input and inter-task communication data gets connected dynamically to that core where any given app-task-inst may be executing at any given time.

In certain embodiments, the control outputs from the controller 140 also include indications for presently executing task instances that were not selected for execution on the next CAP to back up their processing context from their present execution cores to their memories 550 before the assigned tasks are switched for these cores. Note that this minimal interaction between the software and the processor hardware fabric can also be replaced by hardware routines in certain embodiments of the invention. In a particular embodiment, when an app-task-inst software is signaled by the controller 140 to exit its present execution core, the software running on it configures a given device register at its present core to launch a hardware routine to automatically copy the state variables (e.g. processor core register file contents) from the core to a specified address range of the RAM 550 associated with the app-task-inst signaled to exit. Moreover, in such an embodiment, as the exiting app-task-inst's processing state thus gets transferred to the existing app-task-inst's RAM 550, another hardware routine copies the previously backed up processing state for the next app-task-inst assigned for the given core (e.g. to the core's register file) from the RAM 550 of such incoming app-task-inst.

According to the embodiments of the invention studied herein in greater detail, the rest of the controller 140 functionality is per e.g. the reference [3], [4] and [5].

Generally, as is the case with the herein described fast-access memory content optimization and associated task instance scheduling optimizations, neither any user or system software running on the processors utilizing these inventive techniques needs to get involved with or even be aware of the these hardware automated routines handling the dynamic optimization of the execution environment for the user programs. This system architecture per the inventions is thus expected to enable scaling the application program capacities and processing performance beyond the limits of conventional systems where the increase in system software overhead would place a limit on scalability.

Moreover, according to an embodiment of the invention, while there is a dedicated fast-access RAM 550 on the processor for each of its locally hosted application task instances, there is a dedicated slow-access RAM 850 for each application program hosted on the given processor. Such an application-program specific RAM 850 has memory segments within for each of its task instances dynamically executing on that processor. For context, note that the input and output (IO) pin capacity limits of the processor chip may not allow providing separate slow-access RAMs for each application task instance hosted on the given processor, and that's why the task instances of any given application may need to share the same application-specific slow-access RAM. The hardware logic modules 700 in such implementation scenarios also are specific to a given application program, and for each given application, its specific module 700 arbitrates the write and read accesses to the slow-access RAM 850 of the application requested by its local task instances (inst:s). In some of such embodiments, the hardware logic 700, in arbitrating access among the memory content transfer requests of the inst:s of its associated application to the slow-access RAM of that application, uses one or more of the following criteria in selecting the next memory transfer request to be performed: 1) the time that a given requested memory context transfer has been waiting to be served, with longer elapsed waiting times increasing the priority of the request, 2) the execution priority of the requesting inst as considered without regard to whether any given inst is waiting for completion of its memory content transfer requests, and 3) the indicated 10 length of the requested memory content transfer, with the longer transfers getting reduced priority. With such prioritization and (dynamic) scheduling of the memory transfer requests, the hardware logic 700 can determine the present expected total time until the completion of any given fast/slow-access RAM content transfer requested 10 by a task instance, and accordingly advertise this as the memory content transfer status 20 (as a number of clock cycles until completion of updating the fast-access RAM for a given task inst) to the controller 140, for the controller to use an input in prioritizing and selecting the task instances for execution on the cores under its control for the successive CAPs.

Furthermore, embodiments of the invention include, besides the slow-access RAM 850, also a non-volatile media 950 for storing the application programs hosted on a given processor that utilizes the invented memory management techniques. Note that in certain embodiments, what is in FIG. 1 labeled as slow-access RAM 850, may itself already provide non-volatile storage, i.e., in such embodiments, the functionalities of the memories 850 and 950 per FIG. 1 may be provided by the same memory device (per a given application). However, typically non-volatile memories have longer (write) access latencies than volatile memories (static RAM) and thus in many envisioned embodiments an slow-access SRAM 850 (a volatile memory with greater storage capacity than the fast-access RAM 550) is used besides a non-volatile backup memory (e.g. flash) 950. In at least some embodiments with a separate non-volatile memory 950 accessible by the hardware logic modules 700 of the processor chip, the modules 700 further provide device registers that the software application programs running on the cores of the processor can configure 10 to command their associated hardware modules to perform copying of contents of specified memory ranges between their non-volatile (e.g. flash) 950 and volatile (e.g. SRAM) 850 slow-access memories. Similar device register bit fields can be used for a given application program to control the memory content transfers between the non-volatile 950 and volatile 850 slow-access memories of the given application as the example in Table 1 regarding the control of content transfers between the fast and slow access RAMs of a given application task instance. In addition, in these embodiments with a further non-volatile memory 950 accessible by the hardware modules 700, the device registers 710 per Table 1 format can further include a bit or bits accompanying the start address for the slow-access memory whose values tell the hardware logic performing the memory content transfers whether the slow-access memory to be used as source/target of the transfer is the non-volatile memory 950 or volatile memory 850 of the application. Also, for the device registers controlling memory content transfers between the non-volatile 950 and volatile 850 slow-access memories of a given application program, the program configuring that device register is to also specify, via values it writes in an associated device register bit, whether the hardware module 700 is to signal 20 to the controller 140 the application task instance(s) behind the requested memory content transfer between the slow-access memories as waiting for completion of such a transfer. While the hardware module 700 will in any case provide a status 20 of completion for the program that issued the request 10 for the memory content transfer between the non-volatile memory 950 and volatile 850 slow-access memory of the program, including optionally the (expected) time remaining until completion, during times of an active memory content transfer between these slow-access memories, the module 700 will report the program (instances) as waiting for completion of such requested memory content transfer, if the program issuing such a request 10 so specified via the associated device register bit.

In at least some embodiments of the invention, while there is dedicated fast-access RAM 550 for each supported instance of each application task hosted on a given processor, along with a dedicated slow-access RAM 850 for each application hosted on that processor, there is a common volatile memory 950 for storing the program code and any back up data for all the applications dynamically sharing the given manycore processor. This practice reduces the IO pin count requirement for the processor chip while still providing sufficient memory access performance, since accesses by the applications to their (slowest-access of the three memories discussed) slow-access non-volatile memory 950 will in practice be relatively infrequent, and can in certain cases be limited to mainly application start up periods. In cases of such common non-volatile memory 950 being shared among all the applications running on a given processor, the application specific modules 700 interact through a per-processor-chip common arbitrator hardware logic module which provides for each application its fair share of interface 900 bandwidth to the common backup memory 950 as well as enforces write and read access rules between the different applications, e.g. by keeping any given application-specific segments of the memory as non-writeable and/or non-readable by the other applications, as well as potentially non-writeable also by the application to whom such memory segments belong to. In a particular implementation scenario, the arbitrator connecting the processor to common backup memory interface 900 simply time-divides the access to the memory 950 among the applications on the processor either evenly or according to contractual entitlements to such interface capacity by the applications. In an alternative implementation, the arbitrator for accessing the memory 950 allows any given application to get as much of its demand for the interface 900 bandwidth (e.g. time share over a specified monitoring period) as is possible without violating any other application's actually materialized demand for access to its fair or contractually entitled share of the interface 900 capacity. In alternative implementation scenarios still, there is a dedicated non-volatile memory 950 for each application hosted on a given processor, with no need for arbitration among the applications for access to the interfaces 900.

Together, the memory architecture and resource access systems and methods per above and the references [1]-[8] keep the individual applications among a set of application dynamically sharing a given manycore processor effectively, as desired, isolated from each other's. Such isolation means that, e.g., the resource access levels available for any given application among such set the will not be negatively impacted by the behavior of any of other application among that set, at least compared to a case of static resource allocation among the applications and possibly their tasks and instances. Moreover, the hardware based dynamic resource management techniques per these disclosures do not enable any undesired or unauthorized interaction between the applications sharing the manycore processor systems according to these specifications. However, the applications running on the processors using the disclosed inventive techniques benefit from the cost-efficiencies created by the secure, deterministic, yet dynamically optimized sharing of the processing resources.

Note that the terms on-chip and off-chip memories as used herein (incl. reference elements in FIG. 1) are not necessarily in all embodiments of the invention on or off chip, respectively. Rather, the naming conventions of on vs. off chip memory refer to the access latency to the particular memory type: on-chip memory typically provides faster access than off-chip. Hence, the inventive techniques can be used for optimizing memory system performance in various types of scenarios where there are tradeoffs in terms of volumes and access latencies of a given memory class; typically, the higher the storage capacity of a given memory type, the greater its access latency. Thus, despite the references to off-chip memory for convenience in this specification, it shall be understood that e.g. memory 850 can in certain embodiments of the invention also be implemented (at least in part) as on-chip, however still so that its greater storage capacity comes at the expense of higher access latency compared to the memory 550. Also, please note that the term access in this specification generally covers both read and write access. Moreover, the term RAM that is used for convenience in referring to memories herein is not to be understood in a restrictive sense: in various embodiments of the invention, the memories 550 and 850 can encompass memory types also other than random access memory. For instance, certain ranges of these memories can be read-only, etc. What's more, though this and the referenced patent applications mainly disclose processors with multiple processing cores, it shall be understood that the inventive memory access and task scheduling optimization concepts can also be used in cases of a single core processor. Furthermore, references to task instances in this disclosure can refer, depending on the overall system architecture, e.g. the processing system architectures per the referenced patent applications [5] and [4], both to instances of the same task type or different task types.

Generally, this description and drawings are included to illustrate architecture and operation of practical embodiments of the invention, but are not meant to limit the scope of the invention. For instance, even though the description does specify certain system elements to certain practical types or values, persons of skill in the art will realize, in view of this description, that any design utilizing the architectural or operational principles of the disclosed systems and methods, with any set of practical types and values for the system parameters, is within the scope of the invention. For instance, in view of this description, persons of skill in the art will understand that the disclosed architecture sets no actual limit for the number of cores in a given system, or for the maximum number of supported applications, tasks or instances. Moreover, the system elements and process steps, though shown as distinct to clarify the illustration and the description, can in various embodiments be merged or combined with other elements, or further subdivided and rearranged, etc., without departing from the spirit and scope of the invention. Finally, persons of skill in the art will realize that various embodiments of the invention can use different nomenclature and terminology to describe the system elements, process phases etc. technical concepts in their respective implementations. Generally, from this description many variants will be understood by one skilled in the art that are yet encompassed by the spirit and scope of the invention.

What is claimed is:

1. A hardware logic control system for an array of processing cores shared among a set of software programs, the system including:

a collection of fast-access memories, with each memory in the collection dedicated to its associated instance of the programs;

a subsystem for updating contents of the fast-access memories based on control by the program instance associated with each given fast-access memory of the collection and indicating whether the contents of any given memory in the collection are updated, with such contents indicated as updated when they are ready for execution of the associated program instance;

a controller for allocating the cores among the programs at least in part based on numbers of such instances of individual programs of said set that have their dedicated fast-access memories indicated as updated by the subsystem; and a subsystem for assigning, for any given program among said set for which the allocating yielded at least one core for an upcoming core allocation period (CAP), from instances of the given program, specific instances for execution on those of the cores that were allocated to the given program for that CAP, wherein the assigning involves: producing an execution priority ordered list of instances of the given program that is used in selecting a subset, up to all, of the instances for execution on the upcoming CAP, through classifying the instances into groups that include, in their descending selection priority order: (1) instances that are not waiting for either arrival of input data or completion of memory content transfers to update their fast-access memories; (2) instances that have input data to be processed but are waiting for completion of memory content transfers between their slow-access and fast-access memories, or instances whose fast-access memory contents are ready for resuming their execution but who are waiting for input data to process; and (3) any remaining ones of the instances.

2. The system of claim 1, wherein said subsystem includes a collection of hardware device registers for managing the updating of contents of the fast-access memories, with each register in said collection dedicated to its associated instance of the programs.

3. The system of claim 2 further including a hardware logic subsystem for connecting each presently executing instance of the programs on the array of cores with its dedicated device register within the collection.

4. The system of claim 2, wherein the hardware device registers for a given program instance include control bits, for the program instance to write to defined values to inform the subsystem of a requested memory content transfer operation to update the contents of its fast-access memory.

5. The system of claim 2, wherein the hardware device registers for a given program instance include status bits, which indicate: i) whether the fast-access memory of the given program instance has its contents updated, or ii) an expression of time until completion of a requested memory content transfer operation to update the contents of the fast-access memory of the given program instance.

6. The system of claim 1, wherein said subsystem indicates the given fast-access memory as updated when said memory is not waiting for a completion of any memory content transfers to it.

7. The system of claim 1, wherein the instance of the given program is: a task, a thread, an actor, or an instance of any of the foregoing, or an independent copy of the given program.

8. The system of claim 1 further comprising: a subsystem for classifying the instances within the group (2) into sub-groups that include, in their descending selection priority order: (i) the instances that have input data to be processed but are waiting for completion of memory content transfers between their slow-access and fast-access memories, and (ii) the instances whose fast-access memory contents are ready for resuming their execution but who are waiting for input data to process.

9. A hardware logic implemented control process for an array of cores shared among a set of software programs, with each of said programs having its set of instances, and with said instances each having its associated dedicated fast-access memory, the process involving the following sub-processes:

updating contents of the fast-access memories based on control by the program instance associated with each given one of the fast-access memories;

indicating whether the contents of any given one of the fast-access memories are updated, with such contents indicated as updated when they are ready for execution of that program instance;

allocating the cores among the programs at least in part based on numbers of such instances of individual programs of said set that have their dedicated fast-access memories indicated as updated; and for any given program among said set for which the allocating yielded at least one core for an upcoming core allocation period (CAP), assigning, from instances of the given program, specific selected instances for execution on those of the cores that were allocated to the given program for that CAP, wherein the assigning involves: producing an execution priority ordered list of instances of the given program that is used in selecting a subset, up to all, of the instances for execution on the upcoming CAP, through classifying the instances into groups that include, in their descending selection priority order: (1) instances that are not waiting for either arrival of input data or completion of memory content transfers to update their fast-access memories; (2) instances that have input data to be processed but are waiting for completion of memory content transfers between their slow-access and fast-access memories, or instances whose fast-access memory contents are ready for resuming their execution but who are waiting for input data to process; and (3) any remaining ones of the instances.

10. The process of claim 9 further involving: classifying the instances within the group (2) into sub-groups that include, in their descending selection priority order: (i) the instances that have input data to be processed but are waiting for completion of memory content transfers between their slow-access and fast-access memories, and (ii) the instances whose fast-access memory contents are ready for resuming their execution but who are waiting for input data to process.

11. The process of claim 9, wherein any such instance within the group (2) that has its expression of time until completion of its requested memory content transfer greater than a duration of the CAP is moved to the group (3) before the assigning.

12. The process of claim 9, wherein any instances within the group (2) are prioritized for execution according to their ascending expressions of time until completion of their requested memory content transfers.

13. The process of claim 9 further involving: i) managing, by instances of the programs, a sub-process of updating contents of their fast-access memories through a collection of hardware device registers, with each register in said collection dedicated to its associated instance of the programs, and ii) connecting each instance of the programs assigned for execution on the array of cores with its dedicated device register within the collection.

14. The process of claim 13, wherein the device registers include status bits, which indicate, for the fast-access memory of the instance of the programs associated with a given register of the collection: i) whether a requested fast-access memory content update operation is completed, or ii) an expression time until a completion of a requested fast-access memory content update operation.

15. The process of claim 14, wherein the process further involves: connecting information from the status bits to the assigning sub-process.

16. The process of claim 9, wherein the instance of the given program is: a task, a thread, an actor, or an instance of any of the foregoing, or an independent copy of the given program.

* * * * *